(12) United States Patent
Knör

(10) Patent No.: US 12,498,039 B2
(45) Date of Patent: Dec. 16, 2025

(54) METHOD AND CONTROL UNIT FOR OPERATING A DRIVE TRAIN OF A VEHICLE

(71) Applicant: ZF Friedrichshafen AG, Friedrichshafen (DE)

(72) Inventor: Jonas Knör, Erbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 295 days.

(21) Appl. No.: 18/455,058

(22) Filed: Aug. 24, 2023

(65) Prior Publication Data

US 2024/0068562 A1    Feb. 29, 2024

(51) Int. Cl.
*F16H 61/04* (2006.01)

(52) U.S. Cl.
CPC . *F16H 61/0403* (2013.01); *F16H 2061/0422* (2013.01)

(58) Field of Classification Search
CPC ............... F16H 61/0403; F16H 2061/0422
See application file for complete search history.

(56) References Cited

U.S. PATENT DOCUMENTS

| | | |
|---|---|---|
| 8,838,350 B2 | 9/2014 | Inuta |
| 10,563,712 B2 * | 2/2020 | Kucharski ............... F16H 59/46 |
| 2022/0242414 A1 * | 8/2022 | Cvok .................... B60W 30/19 |

FOREIGN PATENT DOCUMENTS

| | | |
|---|---|---|
| DE | 10248179 A1 | 4/2004 |
| DE | 102014214876 A1 | 2/2016 |
| DE | 202018104272 U1 | 9/2018 |
| EP | 2690321 B1 | 1/2014 |

OTHER PUBLICATIONS

German Search Report DE 10 2022 208 786.0, dated Feb. 24, 2023. (10 pages).

* cited by examiner

*Primary Examiner* — Aryan E Weisenfeld
(74) *Attorney, Agent, or Firm* — Dority & Manning, P.A.

(57) ABSTRACT

A method for operating a drive train (1) of a vehicle monitoring the actual slip forming at a particular first shift element of a transmission (5), comparing the actual slip with a target slip, adapting a characteristic map depending on a deviation between the actual slip and the target slip. The characteristic map is used to determine a shift-element pressure for providing the target slip for a particular first shift element in order to implement a gear ratio change.

9 Claims, 1 Drawing Sheet

METHOD AND CONTROL UNIT FOR OPERATING A DRIVE TRAIN OF A VEHICLE

CROSS-REFERENCE TO RELATED APPLICATION

The present application is related and has right of priority to German Patent Application No. 102022208786.0 filed on Aug. 25, 2022, which is incorporated by reference in its entirety for all purposes.

FIELD OF THE INVENTION

The invention relates generally to a method for operating a drive train of a vehicle. The invention further relates generally to a control unit for operating a drive train of a vehicle.

BACKGROUND

A drive train of a vehicle includes, in addition to a drive unit, a transmission connected between the drive unit and a driven end. The transmission converts rotational speeds and torques and, in this way, provides the available tractive force of the drive unit at the driven end.

In a hybrid vehicle, the drive unit includes an internal combustion engine and an electric machine. In a fully electric vehicle, the drive unit includes at least one electric machine.

The transmission of a vehicle includes shift elements. In every force-locking gear of the transmission, a first number of shift elements is engaged and a second number of shift elements is disengaged. In order to implement a gear ratio change from an actual gear into a target gear, at least one shift element, which is engaged in the actual gear, is disengaged for the target gear, and at least one shift element, which is disengaged in the actual gear, is engaged for the target gear.

In order to implement gear ratio changes with the highest level of comfort, it is already known to bring a shift element of the transmission that is engaged both in the actual gear and in the target gear into a slip state in order to implement a gear ratio change from an actual gear into a target gear. For this purpose, the particular shift element is actuated with a shift-element pressure that depends on a system pressure of the transmission, wherein an equilibrium of forces between the system pressure and the shift-element pressure is determined by an inflow pressure dependence. The inflow pressure is the pressure that is applied at a hydraulic valve that actuates the particular shift element to be brought into a slip state.

It is already known from practical experience that a characteristic curve for the inflow pressure dependence is stored in a transmission control unit. If a gear ratio change from an actual gear into a target gear is to be implemented at a defined system pressure in the transmission, the shift-element pressure, which is used to actuate the shift element that is engaged in the actual gear and in the target gear and is to be brought into the target slip state for the implementation of the gear ratio change, is determined from the characteristic map of the inflow pressure dependence.

The characteristic map of the inflow pressure dependence may possibly be faulty, however, due to component tolerances and component aging of the transmission. In this case, the desired target slip cannot be provided at the particular shift element.

DE 102 48 179 A1 discloses a method for adapting the charge pressure of a shift element of a transmission. In order to adapt the charge pressure of the shift element, the engaged shift element is disengaged in a defined manner, when the vehicle is stationary, until a predefined differential speed threshold is exceeded.

DE 10 2014 214 876 A1 discloses one further method for adapting a charge pressure of a shift element of a transmission.

SUMMARY OF THE INVENTION

Example aspects of the present invention provide a method for operating a drive train of a vehicle and a control unit for operating a drive train of a vehicle, which, with respect to the shift element of the transmission that is engaged both in the actual gear and in the target gear of a gear shift to be implemented and that is to be brought into a desired target slip state for the implementation of the gear shift, can bring the shift element into the desired target slip state in a targeted manner with greater reliability.

According to example aspects of the invention, the actual slip forming at the particular first shift element of the transmission is monitored and compared with the target slip, wherein a characteristic map is adapted depending on a deviation between the actual slip and the target slip, the characteristic map being used to determine the shift-element pressure for providing the target slip for the particular first shift element in order to implement a gear ratio change.

Example aspects of the invention can monitor the actual slip that is actually forming at the particular first shift element, which is engaged both in the actual gear and in the target gear of the transmission and which is to be brought into a target slip state in a defined manner in order to implement the gear ratio change or the gear shift, and can compare the actual slip with the target slip. The characteristic map is adapted depending on the deviation between the actual slip and the target slip, the characteristic map showing the inflow pressure dependence and being used to determine the shift-element pressure for the particular shift element in order to implement the gear ratio change and, therefore, bring the particular shift element into the target slip state. With the aid of example aspects of the invention, it is possible, by adapting the characteristic map of the inflow pressure dependence, to bring the shift element, which is engaged both in an actual gear and in a target gear of a gear ratio change to be implemented and is to be brought into a target slip state in a defined manner in order to implement the gear ratio change, into a slip state such that the actual slip that is forming corresponds to the target slip. As a result, gear ratio changes can be carried out with a higher level of comfort.

Preferably, the actual slip is determined depending on an actual torque and a target torque at the electric machine. The actual slip that is forming can be easily and reliably determined as a result.

Preferably, the characteristic map is adapted when the amount of the deviation between the actual slip and the target slip is greater than a limit value. The characteristic map is adapted in this case only when the amount of the deviation between the actual slip and the target slip is greater than a limit value. Adaptation is not carried out in the case of smaller deviations.

Preferably, when the actual slip is less than the target slip, the shift-element pressure, which depends on the system pressure, is increased in order to adapt the characteristic map via an offset value. When the actual slip is greater than the target slip, the shift-element pressure, which depends on the system pressure, is decreased in order to adapt the characteristic map via an offset value. Thus, the adaptation can be carried out in a particularly advantageous manner.

Preferably, the method is utilized and applied in a hybrid vehicle that includes an internal combustion engine, wherein the electric machine is connected between the internal combustion engine and the transmission, and wherein the internal combustion engine is decouplable via a separating clutch, which is connected between the electric machine and the internal combustion engine. The method can also be utilized and applied in a fully electric vehicle.

BRIEF DESCRIPTION OF THE DRAWINGS

Exemplary embodiments of the invention are explained in greater detail with reference to the drawings, without being limited thereto, wherein.

DETAILED DESCRIPTION

Figure 1:
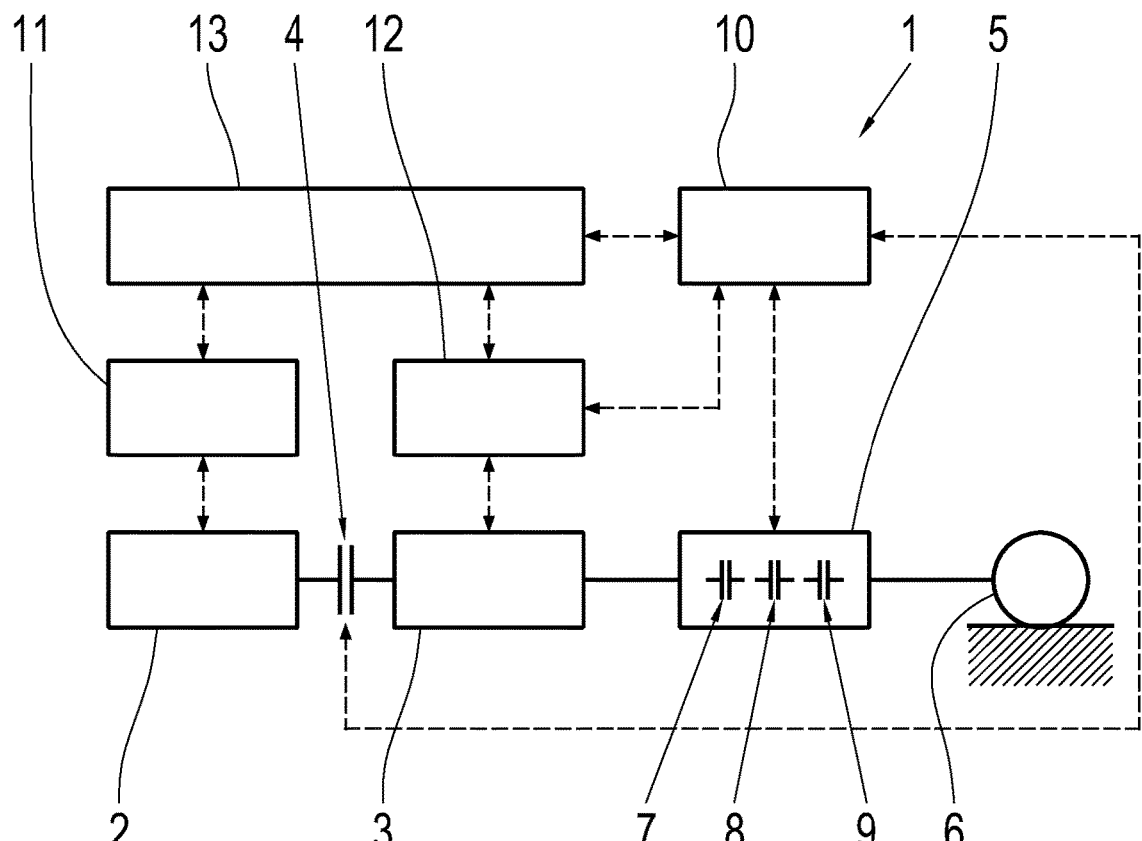
FIG. 1 shows a block diagram of a drive train of a vehicle in the form of a hybrid vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a diagram of a drive train 1 of a hybrid vehicle. The hybrid vehicle includes a drive unit, which has an electric machine 3 and an internal combustion engine 2. A separating clutch 4 is connected between the electric machine 3 and the internal combustion engine 2. A transmission 5 is connected between the electric machine 3 and a driven end 6 of the hybrid vehicle.

For the case in which the separating clutch 4 is disengaged, the internal combustion engine 2 is decoupled from the electric machine 3, from the transmission 5, and from the driven end 6. In this case, when a force-locking gear is engaged in the transmission 5, drive torque is provided at the driven end 6 exclusively starting from the electric machine 3. When the separating clutch 4 is disengaged, the internal combustion engine 2 can run or be shut off.

For the case in which the drive train 1 from FIG. 1 is operated with the separating clutch 4 disengaged and the internal combustion engine 2 shut off, the condition of a purely electric operation is present.

For the case in which the internal combustion engine 2 runs while the separating clutch 4 is disengaged, for example, in order to drive a generator (not shown) and charge an electric energy store (not shown), a serial driving operation of the drive train 1 is present.

The transmission 5 has at least three shift elements 7, 8 and 9. In each force-locking gear of the transmission, a first number of shift elements of the transmission is disengaged and a second number of shift elements of the transmission is engaged.

If a gear ratio change from an actual gear into a target gear is to be implemented in the transmission 5, at least one shift element, which is engaged in the actual gear, is disengaged for the target gear, and at least one shift element, which is disengaged in the actual gear, is engaged for the target gear.

In order to implement a gear ratio change from an actual gear into a target gear, a shift element of the transmission that is engaged in the actual gear and in the target gear is actuated with a shift-element pressure, which depends on a system pressure of the transmission 5, in order to provide a defined target slip at the shift element. This shift element, which is engaged in the actual gear and in the target gear and is to be brought into a slip state in order to implement the gear ratio change, is referred to in the following as the first shift element. This first shift element is typically the shift element that transmits the highest torque.

Subsequent to the particular first shift element having been brought into a slip state, the particular gear shift and thus the particular gear ratio change are implemented, specifically by subsequently disengaging a particular second element, which is engaged in the actual gear, for the target gear and engaging a particular third shift element, which is disengaged in the actual gear, for the target gear.

Figure 2:
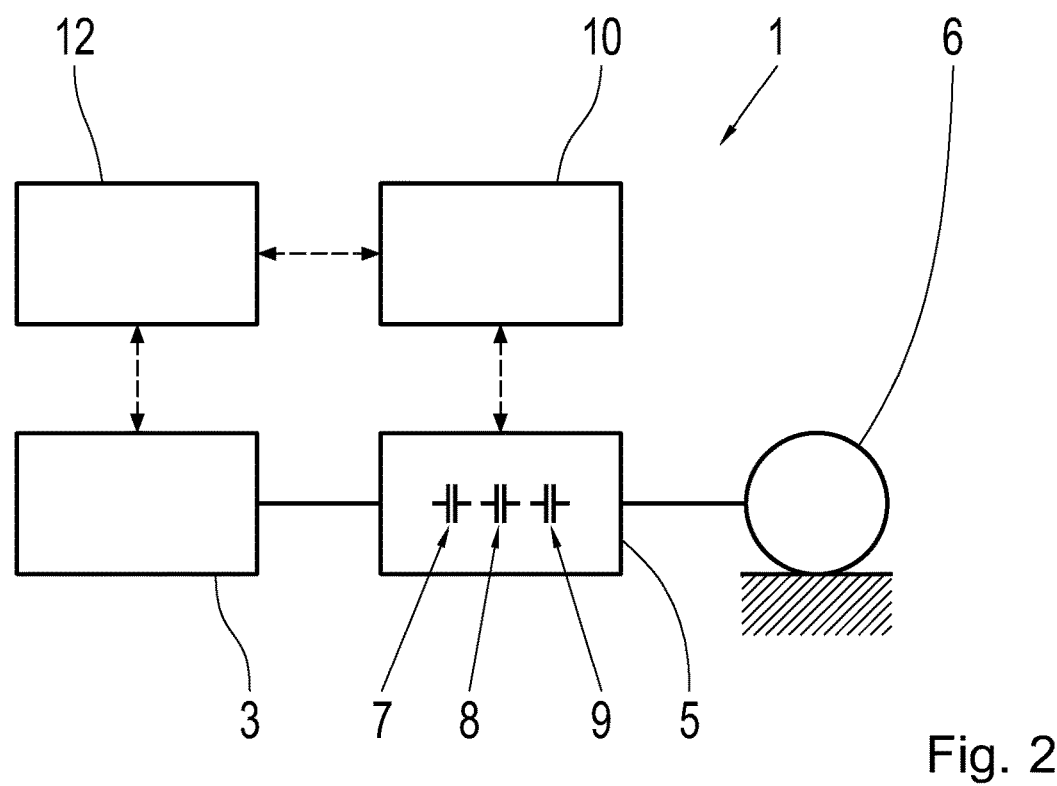
FIG. 2 shows a block diagram of a drive train of a vehicle in the form of a fully electric vehicle.

While FIG. 1 shows a drive train of a vehicle in the form of hybrid vehicle, FIG. 2 shows a drive train configuration of a purely electric vehicle. A purely electric vehicle does not have an internal combustion engine 2. Therefore, the internal combustion engine control unit 11 and the hybrid control unit 13 as well as the separating clutch 4 can also be dispensed with.

With respect to the assemblies 3, 5, 6, 7, 8, 9, 10 and 12, however, the drive train from FIG. 2 matches the drive train from FIG. 1, and so identical reference signs are used for identical assemblies in order to avoid unnecessary repetitions.

FIG. 1 also shows control-side assemblies of the drive train, such as a transmission control unit 10, which controls the operation of the transmission 5 by way of an open-loop and/or closed-loop system. For this purpose, the transmission control unit 10 exchanges data with the transmission 5 as indicated by the double arrow shown. The separating clutch 4 connected between the internal combustion engine 2 and the electric machine 3 can also be actuated via the transmission control unit 10.

The operation of the internal combustion engine 2 is controlled by an internal combustion engine control unit 11 by way of an open-loop and/or closed-loop system. The operation of the electric machine 3 is controlled by an electric machine control unit 12 by way of an open-loop and/or closed-loop system. For this purpose, the internal combustion engine control unit 11 exchanges data with the internal combustion engine 2 and the electric machine control unit 12 exchanges data with the electric machine 3, as indicated by the dashed-line arrows in both cases. The internal combustion engine control unit 11 and the electric machine control unit 12 also exchange data with a hybrid control unit 13.

In addition, the hybrid control unit 13 exchanges data with the transmission control unit 10. According to FIG. 1, the transmission control unit 10 can also communicate directly with the electric machine control unit 12. Although not shown in FIG. 1, a direct data exchange can also take place between the internal combustion engine control unit 11 and the electric machine control unit 12.

The hybrid control unit 13 can be an integral part of the internal combustion engine control unit 11 on the hardware side. It is possible, however, that the hybrid control unit 13 is an integral part of the transmission control unit 10 on the hardware side.

The hybrid control unit 13 controls, by way of an open-loop and/or closed-loop system, in particular, a torque output from the internal combustion engine 2 and the electric machine 3. The transmission control unit 10 controls, by way of an open-loop and/or closed-loop system, the operation of the transmission 5 and of the separating clutch 4.

Although this system architecture of the control units 10, 11, 12 and 13 is preferred, another control-side system architecture can also be implemented, of course.

Example aspects of the present invention provide a method for operating the drive train from FIG. 1 or the drive train from FIG. 2, with which it can be ensured that gear ratio changes from an actual gear into a target gear are implemented in the transmission 5 with a high level of comfort.

As mentioned above, in order to implement a gear ratio change in the transmission 5 from an actual gear into a target gear, a particular first shift element of the transmission 5, which is engaged both in the actual gear and in the target gear, is actuated with a shift-element pressure, which depends on the system pressure of the transmission 5, in order to provide a target slip at the particular first shift element. Subsequently, a particular second shift element of the transmission 5, which is engaged in the actual gear, is disengaged for the target gear and a third shift element of the transmission 5, which is disengaged in the actual gear, is engaged for the target gear.

According to example aspects of the invention, the actual slip that is forming at the particular first shift element of the transmission 5 is monitored and compared with the target slip. A characteristic map is adapted depending on a deviation between the actual slip and the target slip. The characteristic map is used to determine the shift-element pressure for the particular first shift element of the transmission 5 in order to implement the gear ratio change, which shift-element pressure is to provide the defined target slip at the particular first shift element.

This characteristic map typically includes shift-element pressures for multiple different system pressures, which shift-element pressures are to provide the desired target slip at the particular first shift element. This characteristic map shows the inflow pressure dependence of the particular shift element, namely of a hydraulic valve actuating the particular shift element.

According to example aspects of the invention, the actual slip that is forming at the particular first shift element of the transmission 5 is monitored and compared with the target slip. The characteristic map is adapted depending on a deviation between the actual slip and the target slip. The characteristic map is used to determine the shift-element pressure for the particular first shift element of the transmission 5 in order to implement a gear ratio change. As mentioned above, the particular first shift element is the shift element that is engaged both in the actual gear and in the target gear of the gear ratio change to be implemented and that is to be brought into the target slip via the shift-element pressure prior to implementation of the actual gear ratio change.

For the case in which the actual slip is less than the target slip at the particular first shift element of the transmission 5 due to the shift-element pressure, which has been determined via the characteristic map, the shift-element pressure, which depends on the system pressure, is increased via an offset value in order to adapt the characteristic map. However, when the actual slip is greater than the target slip, the shift-element pressure, which depends on the system pressure, is decreased in order to adapt the characteristic map via an offset value.

The particular characteristic map, which shows the inflow pressure dependence for the particular first shift element, is thus adapted via the offset value.

In this way, a particular first shift element, which is engaged both in the actual gear and in the target gear, can be brought into the target slip state more reliably prior to an implementation of a gear ratio change.

It is possible that the adaptation is carried out only when the amount of the deviation between the actual slip and the target slip at the particular first shift element of the transmission 5 is greater than a limit value. In the case of smaller deviations between the actual slip and the target slip, which are less than the particular limit value, the characteristic map is not adapted.

The actual slip at the particular first shift element of the transmission 5 is preferably determined depending on the actual torque and the target torque at the electric machine 3. In this way, the actual slip can either be calculated depending on the actual torque and the target torque or determined depending on the characteristic map.

In particular, the method can be utilized in a hybrid vehicle according to FIG. 1. The method according to example aspects of the invention can also be applied in a fully electric vehicle according to FIG. 2.

Example aspects of the invention further relate to a control unit of a vehicle, which is designed to automatically carry out the method according to example aspects of the invention. This control unit is, in particular, the transmission control unit 10. The transmission control unit 10 is in the form of an electrical or electronic control unit and includes hardware and software for carrying out the method. The hardware include data interfaces, in order to exchange data with the assemblies that contribute to the execution of the method according to example aspects of the invention, such as, for example, with the electric machine control unit 10, which provides the actual torque and the target torque at the electric machine 3. Moreover, the hardware includes a processor for data processing and a memory for data storage.

The software include program modules, which are implemented in the control unit 10 to carry out the method according to example aspects of the invention.

The control unit is designed, in order to implement a gear ratio change from an actual gear into a target gear, to actuate a particular first shift element of the transmission 5, which is engaged both in the actual gear and in the target gear, with a shift-element pressure, which depends on the system pressure of the transmission 5, in order to provide the target slip at the particular first shift element of the transmission 5. Moreover, the control unit 10 is designed to subsequently actuate a particular second shift element, which is engaged in the actual gear, to disengage for the target gear and to actuate a particular third shift element, which is disengaged in the actual gear, to engage for the target gear. Moreover, the control unit is designed to compare an actual slip that is forming at the particular first shift element of the transmission 5 with the target slip. Depending on the deviation between the actual slip and the target slip, the control unit is designed to adapt a characteristic map, which is implemented in the control unit and used to determine the shift-element pressure for providing the target slip for the particular first shift element in order to implement the gear ratio change.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 drive train
2 internal combustion engine
3 electric machine
4 separating clutch
5 transmission
6 driven end
7 first shift element
8 second shift element
9 third shift element
10 transmission control unit
11 internal combustion engine control unit
12 electric machine
13 hybrid control unit

The invention claimed is:

1. A method for operating a drive train (1) of a vehicle that includes an electric machine (3), a transmission (5), and a driven end (6), the transmission (5) connected between the electric machine (3) and the driven end (6) and including at least three shift elements (7, 8, 9), comprising:
in order to implement a gear ratio change from an actual gear into a target gear, actuating a first shift element of the transmission (5) with a shift-element pressure, which depends on a system pressure of the transmission (5), in order to provide a target slip at the first shift element, wherein the first shift element is engaged both in the actual gear and in the target gear;
disengaging a second shift element of the transmission (5) for the target gear, wherein the second shift element is engaged in the actual gear;
engaging a third shift element of the transmission (5) for the target gear, wherein the third shift element is disengaged in the actual gear;
monitoring an actual slip forming at the first shift element;
comparing the actual slip with the target slip; and
adapting a characteristic map depending on a deviation between the actual slip and the target slip, wherein the characteristic map is configured to determine the shift-element pressure for the first shift element to provide the target slip and implement the gear ratio change.

2. The method of claim 1, wherein monitoring the actual slip comprises determining the actual slip depending on an actual torque and a target torque at the electric machine (3).

3. The method of claim 1, wherein adapting the characteristic map comprises adapting the characteristic map when a magnitude of the deviation between the actual slip and the target slip is greater than a limit value.

4. The method of claim 1, wherein, when the actual slip is less than the target slip, adapting the characteristic map comprises increasing the shift-element pressure in the characteristic map via an offset value.

5. The method of claim 1, wherein, when the actual slip is greater than the target slip, adapting the characteristic map comprises decreasing the shift-element pressure in the characteristic map via an offset value.

6. The method of claim 1, wherein the vehicle is a fully electric vehicle without an internal combustion engine.

7. The method of claim 1, wherein:
the vehicle is a hybrid vehicle with an internal combustion engine (2);
the electric machine (3) is connected between the internal combustion engine (2) and the transmission (5); and
the internal combustion engine (2) is decouplable via a separating clutch (4) connected between the electric machine (3) and the internal combustion engine (2).

8. A control unit (10) for a vehicle configured for automatically implementing the method of claim 1.

9. A control unit (10) for a vehicle configured for:
in order to implement a gear ratio change from an actual gear into a target gear, actuating a first shift element of a transmission (5) with a shift-element pressure, which depends on a system pressure of the transmission (5), in order to provide a target slip at the first shift element, the first shift element engaged in both the actual gear and in the target gear;
actuating a second shift element of the transmission (5) to disengage for the target gear, the second shift element engaged in the actual gear;
actuating a third shift element of the transmission (5) to engage for the target gear, the third shift element disengaged in the actual gear;
comparing an actual slip forming at the first shift element with the target slip; and
adapting a characteristic map depending on a deviation between the actual slip and the target slip,
wherein the characteristic map is usable to determine the shift-element pressure for providing the target slip for the first shift element in order to implement the gear ratio change.

* * * * *